(12) United States Patent
Lu

(10) Patent No.: US 8,991,131 B1
(45) Date of Patent: Mar. 31, 2015

(54) CONSTRUCTION SYSTEM FOR BUILDING CURVED STRUCTURES

(71) Applicant: Baojing Lu, Issaquah, WA (US)

(72) Inventor: Baojing Lu, Issaquah, WA (US)

( * ) Notice: Subject to any disclaimer, the term of this patent is extended or adjusted under 35 U.S.C. 154(b) by 0 days.

(21) Appl. No.: 14/167,436

(22) Filed: Jan. 29, 2014

(51) Int. Cl.
*E04H 12/18* (2006.01)
*F16B 17/00* (2006.01)

(52) U.S. Cl.
CPC ................................. *F16B 17/00* (2013.01)
USPC .................................................... 52/645

(58) Field of Classification Search
USPC ......... 52/645, 646, 648.1, 651.01, 80.1, 81.1, 52/81.2, 81.3
See application file for complete search history.

(56) References Cited

U.S. PATENT DOCUMENTS

| | | | | |
|---|---|---|---|---|
| 1,860,627 A * | 5/1932 | Sherman | ........................ | 446/113 |
| 2,206,149 A * | 7/1940 | Balinkin | ........................ | 434/277 |
| D169,878 S * | 6/1953 | Washington | ................. | D21/468 |
| 3,769,772 A * | 11/1973 | Oetiker | ........................... | 52/646 |
| 3,977,683 A * | 8/1976 | Tomura | ........................ | 273/155 |
| 4,182,086 A * | 1/1980 | Crooks | ........................... | 52/81.2 |
| 4,509,929 A * | 4/1985 | Zawitz | ........................... | 446/102 |
| 4,992,069 A * | 2/1991 | Bolli et al. | ..................... | 446/128 |
| 5,265,395 A * | 11/1993 | Lalvani | ......................... | 52/648.1 |
| 5,304,086 A * | 4/1994 | Bolli et al. | ..................... | 446/108 |
| 5,761,871 A * | 6/1998 | Atake | ........................... | 52/653.1 |
| 5,951,299 A * | 9/1999 | Kim | ............................. | 434/188 |
| 6,135,851 A * | 10/2000 | Drake et al. | ................... | 446/487 |
| 6,401,404 B1 * | 6/2002 | Fillipp et al. | .................. | 52/80.1 |
| 6,948,998 B2 * | 9/2005 | Bagley | ............................ | 446/124 |
| 7,040,949 B2 * | 5/2006 | Slocum | ........................... | 446/122 |
| 8,210,898 B2 * | 7/2012 | Johnson | ........................ | 446/487 |
| D665,041 S * | 8/2012 | Tolis | ............................ | D21/781 |
| 2012/0180405 A1 * | 7/2012 | Drake | ............................ | 52/81.3 |
| 2013/0210314 A1 * | 8/2013 | Rottjer et al. | ................. | 446/124 |

* cited by examiner

*Primary Examiner* — Mark Wendell
*Assistant Examiner* — Keith Minter
(74) *Attorney, Agent, or Firm* — Plager Schack LLP

(57) ABSTRACT

A construction system for use in building a frame for a curved structure includes a plurality of elements fastened together to construct the frame. The construction system includes a plurality of flexible strips affixed to one another to form the frame of the curved structure, each flexible strip having a plurality of apertures and connection nodes disposed throughout a longitudinal axis of the strip. A user orients each flexible strip to a desired curvature and engages one of the connection nodes of the flexible strip with an aperture of one of the plurality of flexible strips. The flexible strips may be plastic to enable the user to create the frame of a curved structure as a stand alone unique work of art or a paper mache support. The flexible strips may be steel to enable the user to create the frame of a curved structure of a full-sized building.

7 Claims, 3 Drawing Sheets

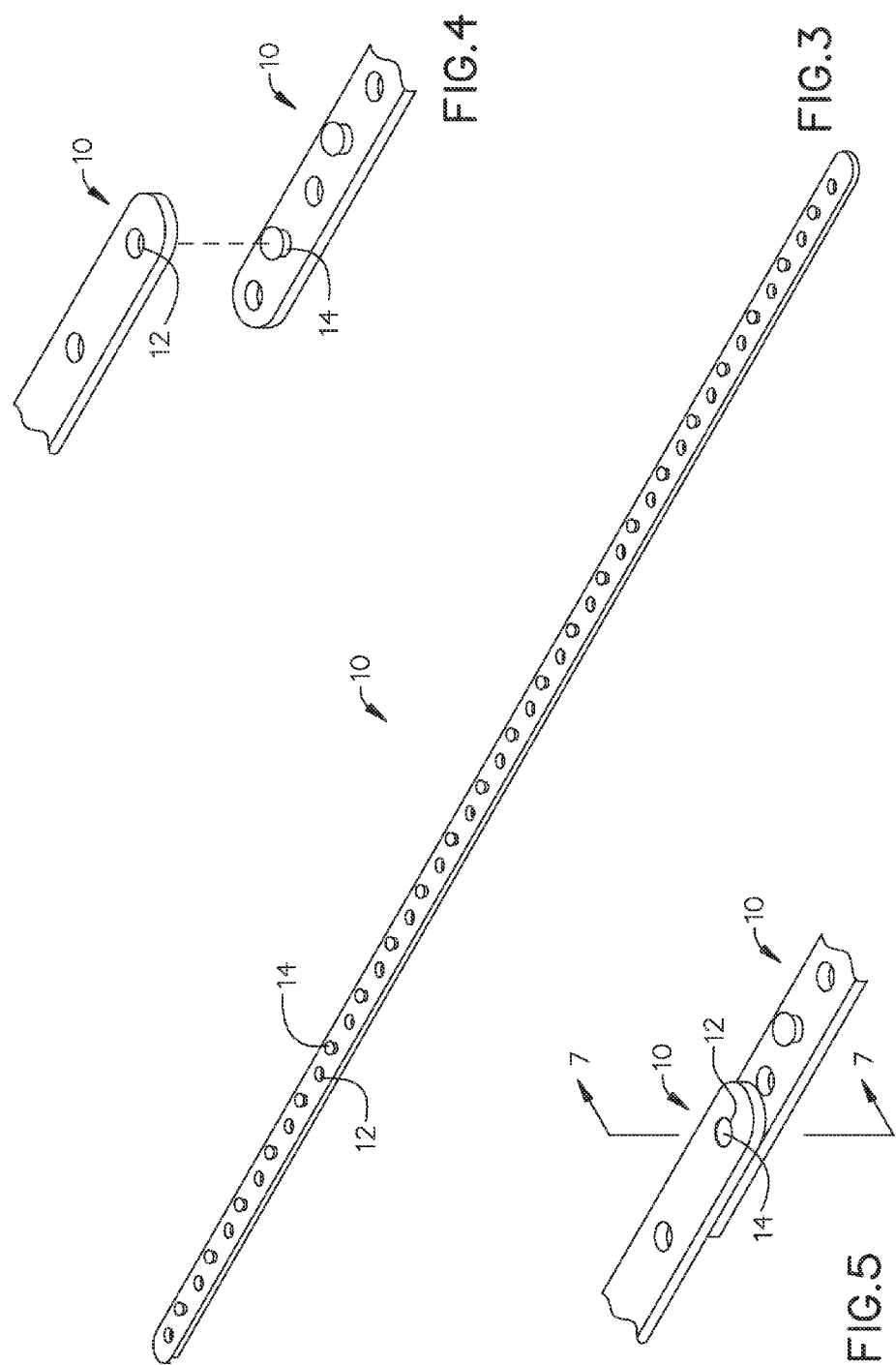

CONSTRUCTION SYSTEM FOR BUILDING CURVED STRUCTURES

BACKGROUND

The embodiments herein relate generally to a system for building a frame for curved structures.

Certain buildings and architectural styles have intricate curved surfaces such as domes or a nest-like structure like the Beijing National Stadium. These types of curved structures are often replicated by using toy building sets that enable a user to model these structures. In other applications, users use building sets for creating other unique works of art having curved structures such as paper mache works.

Currently, there are several toy construction sets for building curved structures such as U.S. Pat. Nos. 5,304,086 and 7,040,949, and U.S. Patent Application 2013/0210314. However, these construction sets are limited because they comprise rigid components that are not easily adjusted to a desired curvature. In particular, the components in these systems have limited bending or adjustment points. This limits the user's ability to create frames with continuous curves throughout the components. In addition, these systems are further limited in application to toy construction sets and cannot be used to build full-sized building structures.

As such, there is a need in the industry for a construction system that overcomes the limitations of the prior art. Specifically, there is the need for a construction system for effectively building curved structures, both in model sets and full-sized buildings, which is easy to use and does not require extensive skills by the user.

SUMMARY

A construction system for use in building a frame for a curved structure comprises a plurality of elements configured to be fastened together to construct the frame. The construction system comprises a plurality of flexible strips affixed to one another to form the frame of the curved structure, each flexible strip comprising a plurality of apertures and connection nodes disposed throughout a longitudinal axis of the strip, wherein a user orients each flexible strip to a desired curvature and engages one of the connection nodes of the flexible strip with an aperture of one of the plurality of flexible strips.

In one embodiment of the invention, the flexible strips are made from plastic and are used to create the frame of a curved structure as a stand alone unique work of art. The curved structure can also be used to create a paper mache work of art by adding a paper and/or flour mixture to the assembled frame.

In an alternative embodiment of the invention, the flexible strips may be made from steel and are used to create the frame of a curved structure such as a dome of a full-sized building. In this embodiment, a cloth layer, metal mesh, metal reinforcing bars and concrete are added to the assembled frame.

BRIEF DESCRIPTION OF THE FIGURES

The detailed description of some embodiments of the invention will be made below with reference to the accompanying figures, wherein the figures disclose one or more embodiments of the present invention.

FIG. 3 depicts a perspective view of certain embodiments of the flexible strip of the construction system;

FIG. 4 depicts a detailed exploded view of certain embodiments of the flexible strip of the construction system;

FIG. 5 depicts a perspective view of certain embodiments of the construction system depicting the engagement of the flexible strips;

DETAILED DESCRIPTION OF CERTAIN EMBODIMENTS

Figure 1:
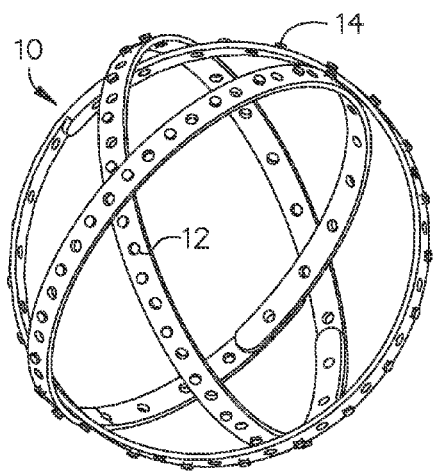
FIG. 1 depicts a perspective view of certain embodiments of the construction system shown in use in an exemplary configuration.
Figure 2:
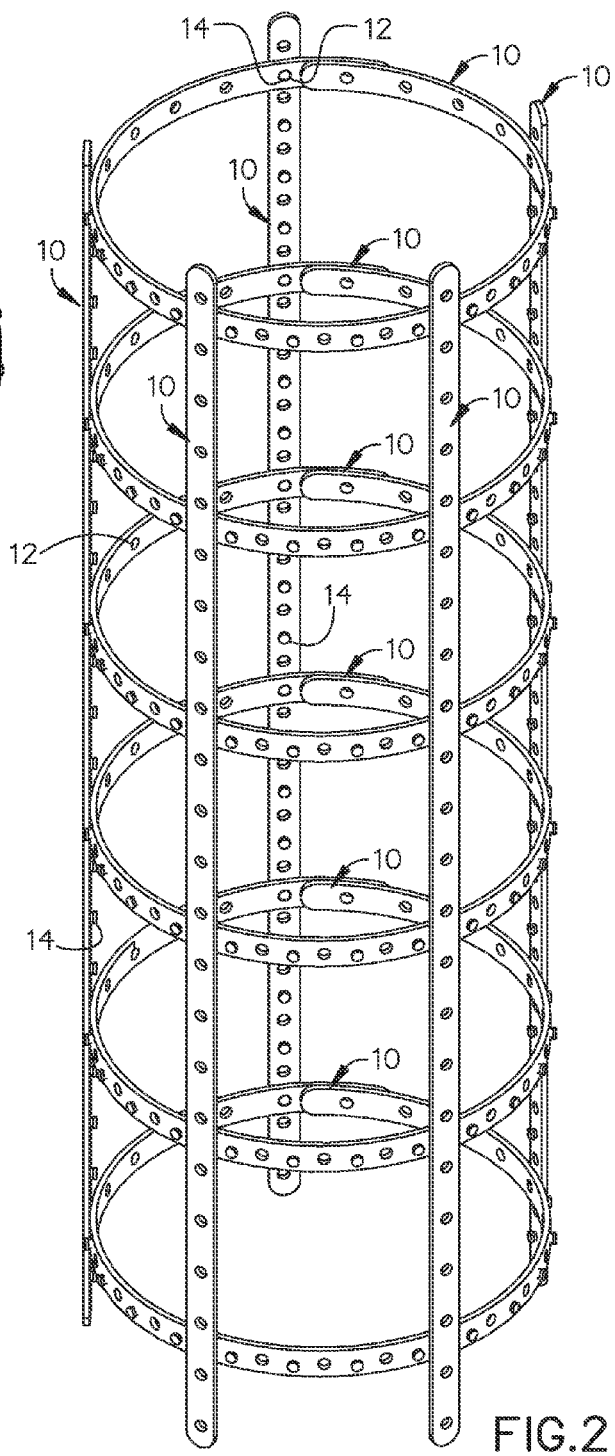
FIG. 2 depicts a perspective view of certain embodiments of the construction system shown in use in an exemplary configuration.

As depicted in FIGS. 1-2, the construction system is configured to build the frame of a curved structure. As used herein, a "curved structure" may comprise any shape such as a spherical, tubular or cylindrical structure, arch, dome, or any alternative structure with a curvature. In certain embodiments of the invention, the construction system comprises flexible strips 10, apertures 12 and teeth 14. Flexible strips 10 are connected to one another when teeth 14 of the strips engage with apertures 12 of the strips.

As depicted in FIG. 3, flexible strip 10 comprises apertures 12 evenly spaced throughout the length of the strip. The top face of flexible strip 10 comprises teeth 14 evenly affixed throughout the length of the strip in between apertures 12. Teeth 14 may have any shape that is capable of snapping into aperture 12 of flexible strip 10. In one embodiment of the invention, flexible strip 10 and teeth 14 are made from plastic. In a preferred embodiment, flexible strip 10 has dimensions of 0.25"×11.5" with apertures 12 and teeth 14 both having a ⅛" diameter. In a preferred embodiment, each flexible strip 10 has 23 apertures and 23 teeth. However, it shall be understood that the dimensions of flexible strip 10 may vary and have any number of teeth and/or apertures. Flexible strip 10 may have any color including, but not limited to, the rainbow colors such as red, orange, yellow, green, blue, indigo and violet.

Figure 6:
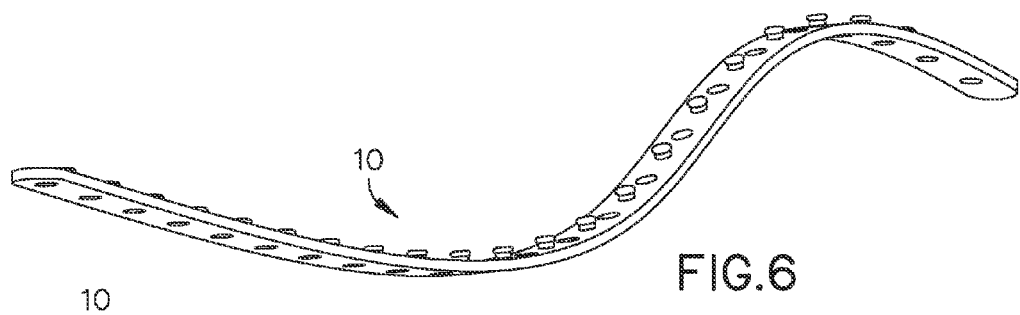
FIG. 6 depicts a perspective view of certain embodiments of the construction system depicting the flexibility of the strip.
Figure 7:
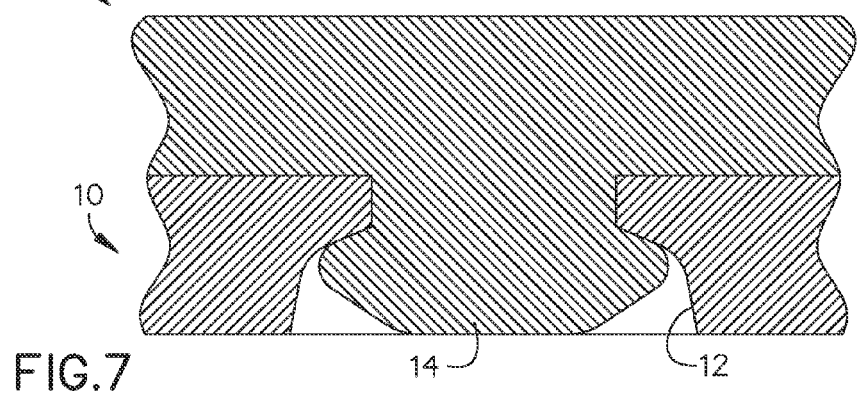
FIG. 7 depicts a section view of certain embodiments of the construction system along line 7-7 in FIG. 5.

As depicted in FIG. 4, to secure two flexible strips together, one tooth 14 of a flexible strip is aligned with an aperture 12 of another flexible strip. As depicted in FIG. 5, tooth 14 is snapped into aperture 12 to engage and secure the two flexible strips together. As depicted in FIG. 6, the flexibility of strip 10 allows each strip to be oriented into any curved position prior to the engagement of the strip with another strip. As depicted in the FIG. 7 section view, tooth 14 is secured within aperture 12. In this position, a portion of the curved inner wall of aperture 12 rests against a portion of the tooth 14 surface.

In operation, a user orients any number of flexible strips 10 into a desired position and secures the strips together by engaging teeth 14 of the strips with apertures 12 of the strips as depicted in FIGS. 1 and 2. The user can engage one or more teeth 14 of flexible strip 10 to the apertures 12 of the same strip. Alternatively, the user can connect teeth 14 of a plurality of flexible strips 10 to apertures 12 of the same flexible strip. Once flexible strips 10 are assembled, the user has created the frame of a curved structure, which can be used as a stand alone unique work of art. In an alternative embodiment, the user can create a paper mache work of art by using the assembled frame as a base structure. To create the paper mache work, the user places a paper and/or flour mixture over the assembled frame. Once the paper and/or flour mixture dries, the assembled frame is removed and the paper mache work of art retains the shape of the frame.

Figure 8:
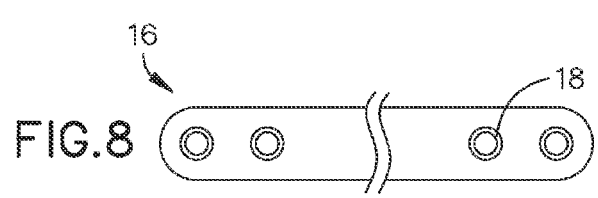
FIG. 8 depicts a top view of an alternative embodiment of the construction system.

As depicted in FIG. 8, an alternative embodiment of the construction system is disclosed to build full-sized curved structures such as a dome. In this embodiment, the construction system comprises steel strip 16, which comprises a plurality of apertures evenly distributed throughout the length of the strip. Teeth 18 are affixed to the apertures of steel strip 16. In a preferred embodiment, steel strip 16 has dimensions of 1"×8' with each tooth 18 having a diameter of ½". Each steel strip 16 has a 1" spacing between each tooth 18.

Figure 9:
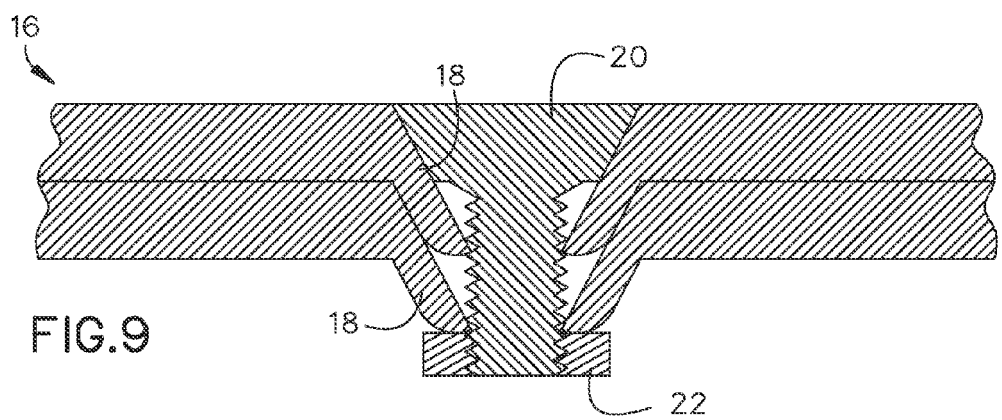
FIG. 9 depicts a section view of an alternative embodiment of the construction system.

As depicted in FIG. 9, each tooth 18 has a circular bowl-like shape with an aperture in a central portion of the tooth. Steel strips 16 are connected to one another by inserting tooth 18 of one strip into the tooth and aperture spacing of another steel strip 16. In this configuration, the steel strips are secured together as tooth 18 of one strip is fitted within the interior of tooth 18 of another strip. Certain connection points of steel strips 16 may be under high tension and/or compression loads. In this situation, screw 20 and screw cup 22 may optionally be used within the apertures of steel strips 16 to provide a more secure connection between teeth 18 of the strips to be engaged. Screw 20 and screw cup 22 may be made from any materials known in the field such as steel.

In operation, a user orients any number of flexible steel strips 16 to a desired curvature and secures the strips together by an engagement of teeth 18 of the strips and optionally screw 20 and screw cup 22. This creates the assembled frame for a curved structure such as a dome. The user places a cloth layer over the assembled frame to create a support layer. The cloth layer may be folded over onto itself and secured by using an adhesive such as glue. A metal mesh is placed over the cloth layer to provide additional support to the structure. Metal reinforcing bars are affixed to the top of the metal mesh. This allows the user to apply a layer of concrete on top of the metal mesh and reinforcing bars to construct the curved structure. It shall be appreciated that any number of additional concrete layers may be added on top of the structure once the initial concrete layer dries. Once the concrete dries, steel strips 16 may be removed and the curved structure is complete. In the completed structure, the cloth layer can be the inside wall in a low profile dome building. In an alternative embodiment, a wood mixture may be used instead of concrete.

It shall be appreciated that the components of the construction system described in several embodiments herein may comprise any alternative known materials in the field and be of any color, size and/or dimensions. It shall be appreciated that the components of the construction system described herein may be manufactured and assembled using any known techniques in the field such as injection-mold and machining techniques.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A construction system for use in building a frame for a curved structure, the construction system comprising a plurality of elements configured to be fastened together to construct the frame, the construction system comprising:

a plurality of flexible strips affixed to one another to form the frame of the curved structure, each flexible strip comprising a plurality of apertures and connection nodes disposed in an alternating pattern throughout a longitudinal axis of the strip;

wherein a user orients each flexible strip to a desired curvature and engages one of the connection nodes of the flexible strip with an aperture of one of the plurality of flexible strips.

2. The construction system of claim 1, wherein each connection node of each flexible strip comprises a tooth.

3. The construction system of claim 2, wherein the apertures of each flexible strip are evenly spaced throughout the longitudinal axis of the flexible strip.

4. The construction system of claim 3, wherein the teeth of each flexible strip are evenly spaced on a top layer of the flexible strip in between the apertures of the strip.

5. The construction system of claim 3, wherein each flexible strip is plastic and comprises one of a plurality of colors, wherein the construction system is used in a toy set to create a stand alone work of art or paper mache support.

6. A construction system for use in building a frame for a curved structure, the construction system comprising a plurality of elements configured to be fastened together to construct the frame, the construction system comprising:

a plurality of flexible strips affixed to one another to form the frame of the curved structure, each flexible strip comprising a plurality of apertures disposed throughout a longitudinal axis of the strip; and a plurality of teeth affixed to the plurality of apertures of the flexible strip, each tooth comprising a circular bowl shaped member with a tapered opening, wherein a user orients each flexible strip to a desired curvature and disposes one of the plurality of teeth of the flexible strip within the tapered opening of the tooth of one of the plurality of flexible strips to enable the pair of teeth to be secured together.

7. The construction system of claim 6, further comprising a threaded screw disposed through the tapered openings of the secured pair of teeth, and a threaded screw cup fastened to an end of the threaded screw.

* * * * *